United States Patent [19]
Bartasevich et al.

[11] 3,973,378
[45] Aug. 10, 1976

[54] CORDLESS GRASS TRIMMER HAVING REMOVABLE BATTERY PACK

[75] Inventors: William E. Bartasevich; James E. Edgell; John E. Jones; Lynn D. Lineback; Roger Q. Smith, all of Danville, Va.

[73] Assignee: Disston, Inc., Danville, Va.

[22] Filed: Mar. 18, 1975

[21] Appl. No.: 559,566

[52] U.S. Cl. .................. 56/11.9; 30/218; 30/DIG. 1; 56/13.6; 56/17.6; 56/246
[51] Int. Cl.² .................................. A01D 55/26
[58] Field of Search .............. 56/11.9, 16.9, 17.6, 56/17.5, 155, 246, 293, 13.5–13.7, 16.7; 30/218, 220, DIG. 1, DIG. 5; 310/50, 47, 89; 15/DIG. 1; 136/173

[56] References Cited
UNITED STATES PATENTS

| | | | |
|---|---|---|---|
| 426,801 | 4/1890 | Hall | 56/293 |
| 1,716,085 | 6/1929 | Perkins | 56/293 X |
| 3,757,194 | 9/1973 | Weber et al. | 30/DIG. 1 |
| 3,763,638 | 10/1973 | Vogelenzang | 56/293 |
| 3,805,385 | 4/1974 | Ritums et al. | 56/17.6 X |
| 3,883,789 | 5/1975 | Achenbach et al. | 30/DIG. 1 |

*Primary Examiner*—J.N. Eskovitz
*Attorney, Agent, or Firm*—B. B. Olive

[57] ABSTRACT

An upright cordless grass trimmer incorporated incoporates fixed multi-toothed bottom blade and plural sets of top blades which oscillate over the bottom blade to achieve cutting. The sets of top blades are driven by a motor through a gear and cam mechanism and are synchronized so that one top blade set cuts at a different time in the cycle from the other set to achieve a counterbalancing and load leveling effect. A clutch mechanism absorbs abrupt blade stoppage and shock situations and a rechargeable battery pack is releasably received by an elevated cavity in a shroud which mounts over the motor and drive mechanism. An upright handle and electrical control means are attached to the trimmer which allows the operator to operate the trimmer in an upright position.

11 Claims, 35 Drawing Figures

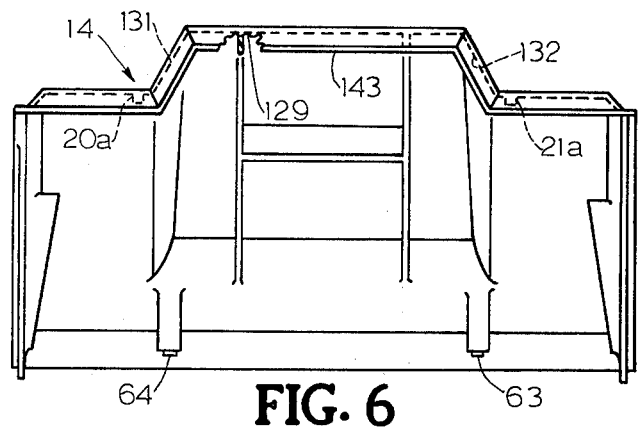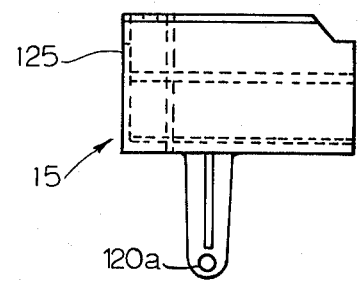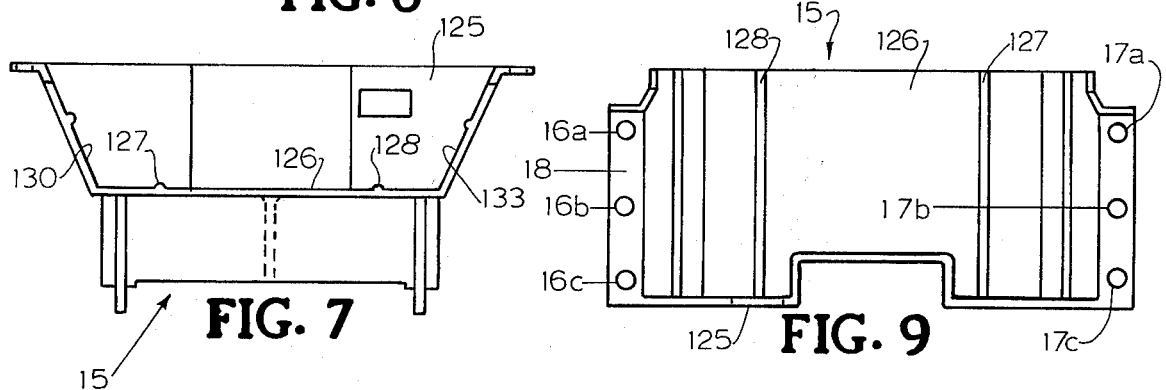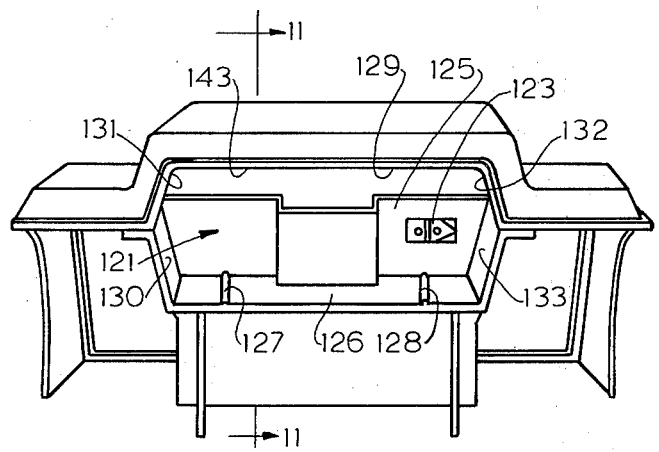

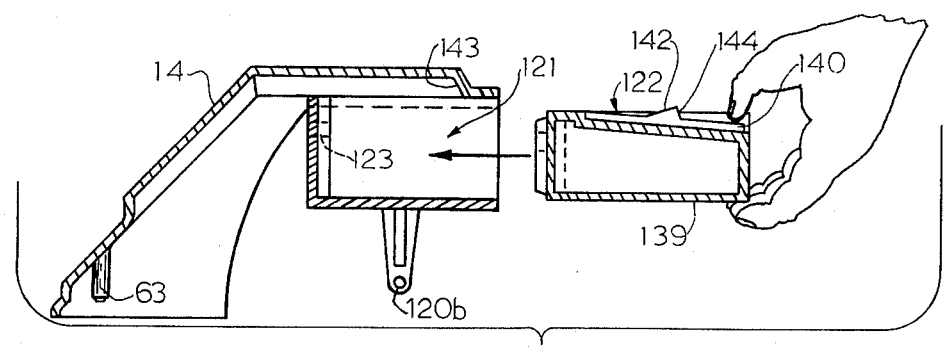
FIG. 11
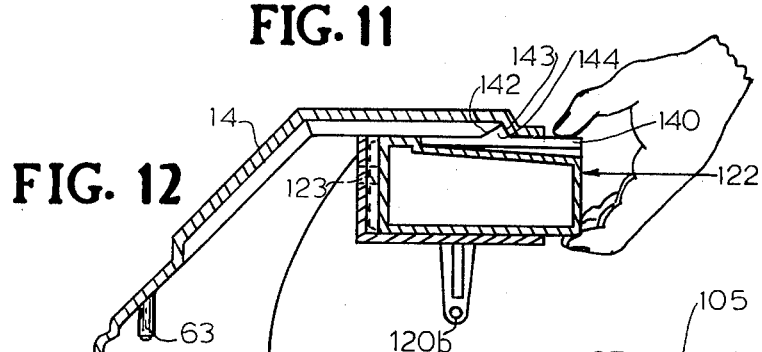
FIG. 12
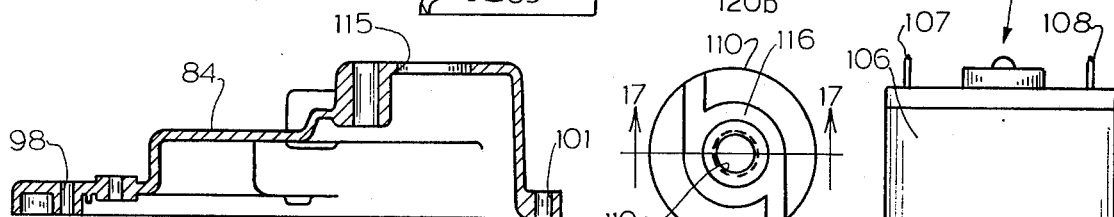
FIG. 13
FIG. 16
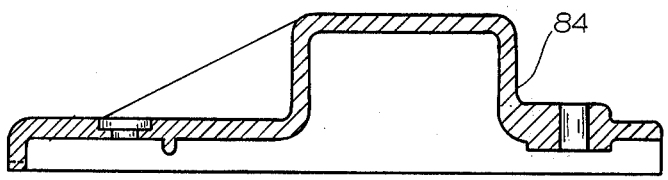
FIG. 14
FIG. 18
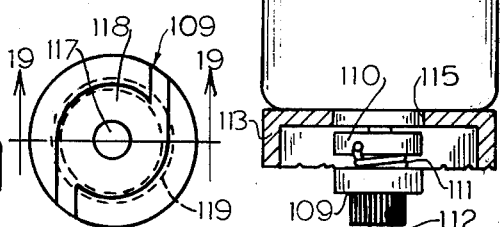
FIG. 15
FIG. 17
FIG. 19
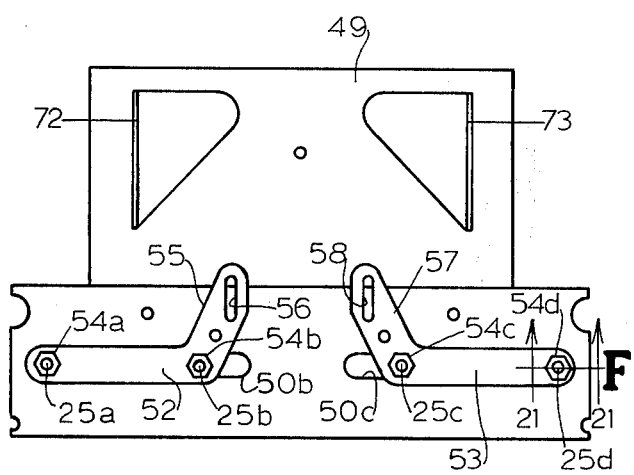
FIG. 20
FIG. 21

CORDLESS GRASS TRIMMER HAVING REMOVABLE BATTERY PACK

BACKGROUND OF THE INVENTION

1. Field of the Invention

The invention relates to battery-operated grass trimmers or mowers. More particularly, the invention relates to rechargeable, battery-operated, upright grass trimmers which cut a relatively wide swath. Certain features apply to A.C. and D.C. tools.

2. Description of the Prior Art

Trimming the edges of lawns adjacent walkways, flower beds, trees, shrubbery, and the like, is required to maintain a well kept appearance. Although there are a large number of devices presently available for accomplishing this chore, ranging from manually powered, scissor-like clippers to large gasoline-powered rotary blade trimmers, all of these devices are lacking in versatility. More recently, battery-powered, oscillating blade grass shears have become popular. This type of shear is available in both hand-held models which require the user to stoop over or kneel down to trim certain relatively narrow widths, e.g., U.S. Pat. Nos. 2,652,626; 3,049,802; 3,212,188; 3,218,710 and 3,623,223; or in models to cut relatively wide swaths, e.g., U.S. Pat. Nos. 3,805,383 and 3,520,120. The conventional way of driving the blades causes all of the driven blade teeth to cut at the same time which creates a highly uneven electrical and mechanical load demand.

A variety of single and multiple teeth bottom blade constructions have been employed with linear, pivotal, and arcuate blade motions as illustrated in U.S. Pat. Nos. 432,433; 1,508,397; 1,644,140; 2,351,460; 2,775,857; 2,840,904; 3,049,802 and 3,218,710. However, none of such constructions teach the employment of a bottom blade formed of metal plate and having sets of teeth mated with sets of teeth formed on coplanar plural replaceable top blades which are individually pivotally mounted on separate spaced apart axes on the bottom blade, formed of thin metal plate, and arranged so that the top blades operate asynchronously, i.e., so that all the teeth cut during a cycle but only selected teeth cut at any particular time. Such a blade configuration offers the possibility of low cost blades, low instantaneous power consumption, reduced vibration, the ability to operate asynchronously, and the ability to cut a relatively wide swath. There is, thus, an acute need for an improved low cost rechargeable battery-powered trimmer and particularly in regard to blade construction and operation. The object of the invention is to use the blade construction and the asynchronous operation described above to meet these objectives.

SUMMARY OF THE INVENTION

The invention relates to an upright grass trimmer for trimming relatively wide swaths of grass. The trimmer employs a fixed multi-toothed bottom blade formed of thin metal plate and four multi-toothed top blades, also formed of thin metal plate, which act as two sets of top blades. The top blades are arranged for oscillatory motion and are phased to achieve near dynamic balance with reduced vibration, and achieve substantial load leveling. The top blades are driven by a battery-pack-powered D.C. motor through a clutch mechanism which absorbs abrupt blade stoppage and blade shock situations. A molded shroud is provided as a covering for the motor and other internal parts and also provides an elevated cavity having an open end for receiving the mating battery pack. The battery pack is removable for recharging and is held in the elevated cavity by a cantilevered strip member molded in the pack housing and which engages the cavity interior. Adjustable handle means are attached to the trimmer and electrical control means are mounted thereon. The operator remains in an upright position and pushes the trimmer along on wheels which are mounted rearwardly of the trimmer blades and on a skid which is mounted adjacent the trimmer blades.

DESCRIPTION OF THE DRAWINGS

FIG. 3 is a perspective view of the assembled internal mechanism without the motor-gear mount base.

FIG. 4 is a perspective view of the assembled internal mechanism with the motor-gear mount base installed.

FIG. 5 is a fragmentary section view taken substantially along line 5—5 of FIG. 4.

FIG. 6 is a rear elevation view of the shroud with a portion thereof cut away for clarity.

FIG. 7 is a rear elevation view of the shroud deck.

FIG. 8 is a side elevation view of the shroud deck of FIG. 7, the side not shown being a mirror image of the illustrated side.

FIG. 9 is a plan view of the shroud deck of FIGS. 7 and 8.

FIG. 10 is a rear pictorial view of the assembled shroud and shroud deck only illustrating the battery pack's receiving recess.

FIG. 11 is a section view of the shroud and deck assembled and being taken substantially along line 11—11 of FIG. 10 and illustrating a battery pack, also in section, about to be inserted into the receiving cavity.

FIG. 12 is a section view similar to that of FIG. 11 but showing the battery pack of FIG. 11 inserted into its proper working position with the pack latched into place.

FIG. 13 is a section view taken substantially along line 13—13 of FIG. 2.

FIG. 14 is a section view taken substantially along line 14—14 of FIG. 2.

FIG. 15 is a fragmentary, section elevation view of the motor subassembly as mounted on the motor/gear base.

FIG. 16 is a somewhat enlarged bottom plan view of the clutch spring plate member illustrated in the FIG. 15 subassembly.

FIG. 17 is a section view taken substantially along line 17—17 of FIG. 16.

FIG. 18 is a top plan view of a pinion-clutch member illustrated in FIG. 15.

FIG. 19 is a section view taken substantially along line 19—19 of FIG. 18.

FIG. 20 is a plan view of the cam bars which operate the sets of top blades and which are shown as they appear mounted on the intermediate plate.

FIG. 21 is a section view taken substantially along line 21—21 of FIG. 20.

DESCRIPTION OF THE PREFERRED EMBODIMENT

Figure 1:
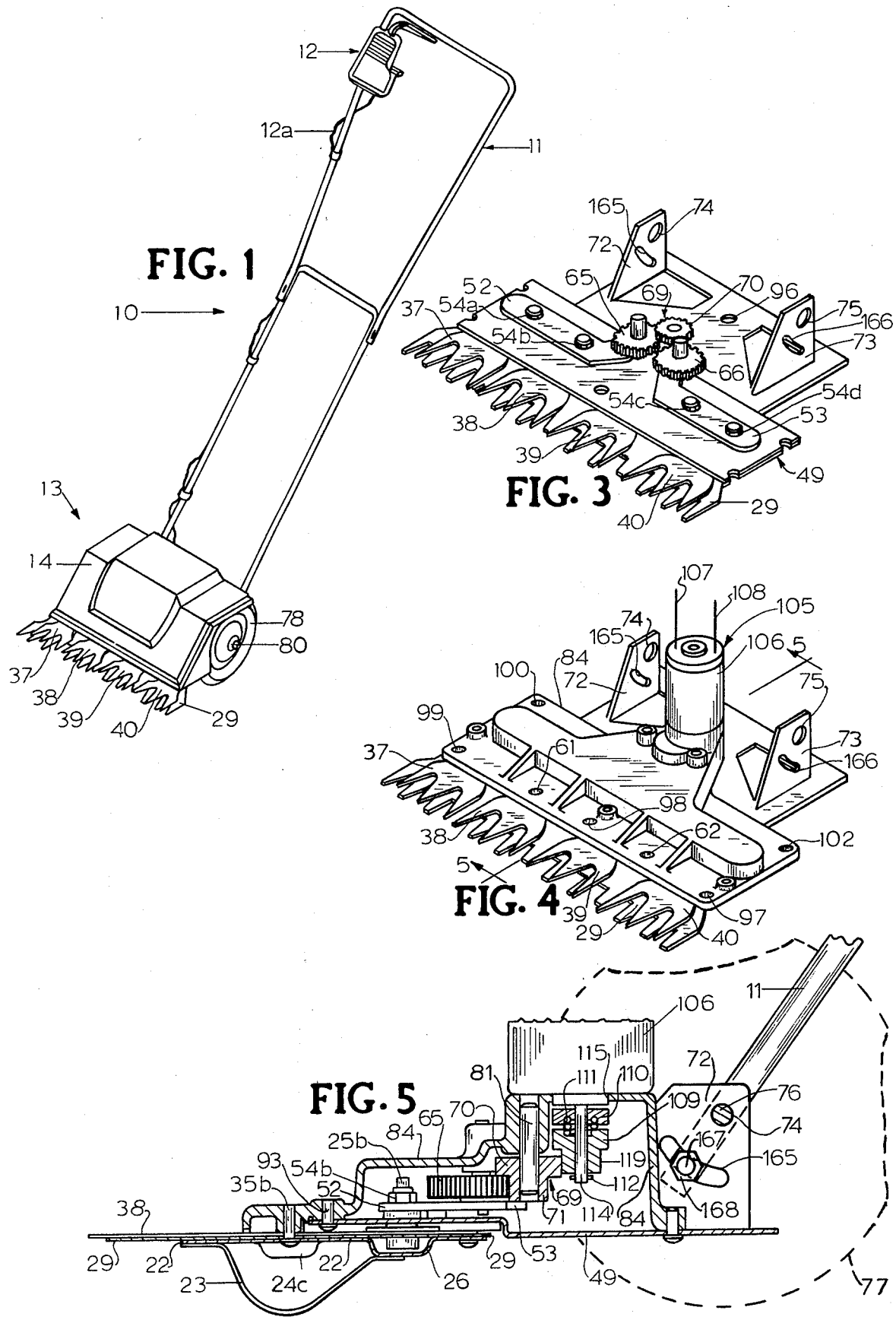
FIG. 1 is a perspective view of the cordless, battery-powered grass trimmer of the present invention.

In FIG. 1 of the drawings of this invention, grass trimmer 10 comprises a handle 11, handle controls 12, and an enclosed trimming mechanism 13. Wiring 12a connects switch, battery and motor.

Figure 2:
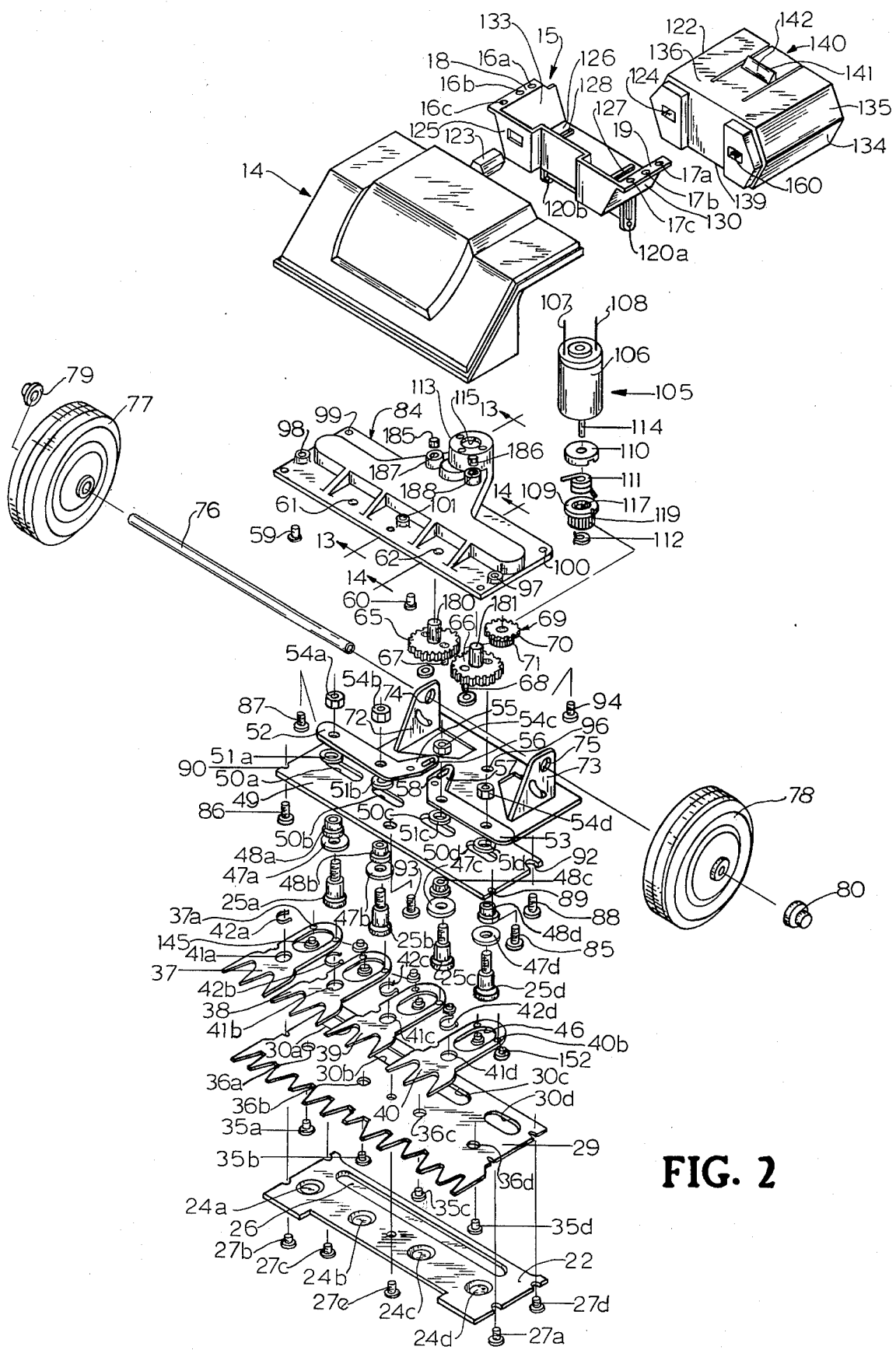
FIG. 2 is an exploded perspective view of the major components of the battery-powered grass trimmer of the present invention with the handle and control portion not shown.
Figure 22:
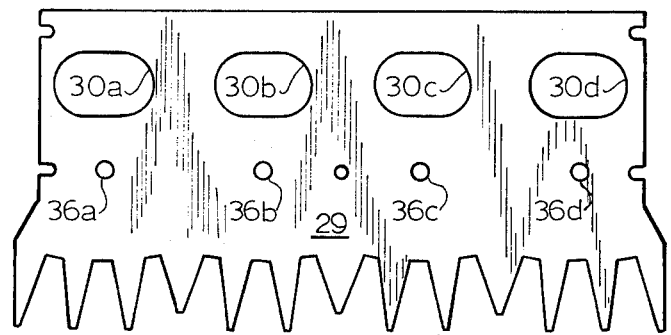
FIG. 22 is a top plan view of the bottom blade and upon which the four top blades are mounted.
Figure 29:
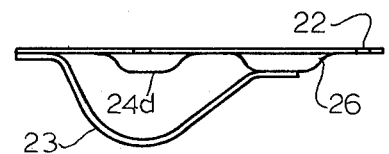
FIG. 29 is an enlarged end elevation view of the skid plate and skid of this invention.

Referring now, in particular, to FIGS. 2, 3 and 4, a description of trimming mechanism 13 will be made. It will be noted that trimming mechanism 13 is mounted beneath and supports a shroud 14 and a shroud deck 15. Shroud 14 and shroud deck 15 are preferably molded and may be secured together by any suitable means or these two parts could conceivably be molded as one integral part. One form of securement of the two parts is illustrated in FIGS. 2, 6 and 9 which show holes 16a, 16b, 16c and 17a, 17b, 17c, respectively, formed in ledges 18, 19 of shroud deck 15. Integrally molded studs, 20a, 20b, 20c and 21a, 21b, 21c of shroud 14, respectively, line up with holes 16a, 16b, 16c and 17a, 17b, 17c (only studs 20a and 21a are illustrated, see FIG. 6). Once aligned, screws (not shown) pass through holes 16a, 16b, 16c and 17a, 17b, 17c into studs 20a, 20b, 20c and 21a, 21b, 21c and thereby in this embodiment unite shroud 14 and shroud deck 15. In the alternative, the studs could be heated or ultrasonically staked in the holes. As later described, the combined shroud 14 and deck 15 provide both a cover for the trimmer mechanism as well as a receptacle for receiving and storing a removable and rechargeable battery pack.

For purposes of ground protection and ground support, FIGS. 2, 5, 24 and 29 illustrate a bottom skid plate 22 and a pair of skids 23 which are secured to plate 22 by welding or otherwise. Skid plate 22 has a single, elongated recessed area 26 which receives the head portions of shank cam bolts 25a, 25b, 25c, 25d (FIG. 2). Skid plate 22 also has four recessed cup areas 24a, 24b, 24c, 24d which are discussed later in the description.

To explain both the assembly and the construction, bolts 25a, 25b, 25c and 25d are placed upright in recess 26 and pins 35a, 35b, 35c, 35d are placed upright and through holes 36a, 36b, 36c, 36d of bottom blade 29 to provide pivots for the top blades, as later explained. The heads of pins 35a, 35b, 35c, 35d reside in and may pivot in recesses 24a, 24b, 24c, 24d. Next during assembly, bottom blade 29 is placed down on skid plate 22 so that bolts 25a, 25b, 25c, 25d pass through elongated openings 30a, 30b, 30c, 30d in bottom blade 29. Also, pins 35a, 35b, 35c 35d are passed through holes 36a, 36b, 36c, 36d, respectively.

Next, top blades 37, 38, 39, 40 are mounted to pivot on pins 35a, 35b, 35c, 35d, respectively. Pins 35a, 35b, 35c, 35d pass through holes 41a, 41b, 41c, 41d of top blades 37, 38, 39, 40 and effectively hold the bottom and top blades together in a closing sliding relation when retaining rings 42a, 42b, 42c, 42d, are placed on pins 35a, 35b, 35c, 35d, respectively, as illustrated. It can be seen that during cutting, top blades 37, 38, 39, 40 pivot about pins 35a, 35b, 35c, 35d. Top blades 37, 38 39, 40 have holes 37a, 37b, 38a, 38b, 39a, 39b, 40a, 40b, respectively, (see FIG. 23) which receive glide buttons 145, 146, 147, 148, 149, 150, 151, 152 in the respective mating holes. The buttons are installed through the bottom of the respective blades 37, 38, 39, 40 so that the head portions of buttons 145, 146, 147, 148, 149, 150, 151, 152 reside on and slide on the upper surface of bottom blade 29. The described head portions of buttons 145, 146, 147, 148, 149, 150, 151, 152 thus effectively tilt blades 37, 38, 39, 40 forward and during cutting tend to increase the force between top blades 37, 38, 39, 40 and bottom blade 29 at their cutting points. By reason of the top blade teeth being curved downwardly, the close sliding relation of the top blades on the bottom blades and the use of the mentioned buttons, the need for a conventional pressure plate is eliminated.

Top blades 37, 38, 39, 40 have openings which provide elongated cam paths 43, 44, 45, 46 (FIGS. 23 through 28) which align respectively with bottom blade openings 30a, 30b, 30c, 30d (FIGS. 22 through 28). The upper portions of the shank cam bolts 25a, 25b, 25c, 25d pass through and reside within the respective cam paths 43, 44, 45, 46.

Cam washers 47a, 47b, 47c, 47d are placed on the respective upper portions of shank cam bolts 25a, 25b, 25c, 25d, respectively, (FIG. 2) so that cam washers 47a, 47b, 47c, 47d reside within cam paths 43, 44, 45, 46, respectively. Shank cam bolts 25a, 25b, 25c, 25d then pass through respective sleeves 48a, 48b, 48c, 48d and extend beyond. An intermediate plate 49 has elongated slots 50a, 50b, 50c, 50d through which the respective threaded ends of shank cam bolts 25a, 25b, 25c, 25d pass. Washers 51a, 51b, 51c, 51d are then mounted respectively on shank cam bolts 25a, 25b, 25c, 25d. A pair of cam bars 52, 53 are designed to be mounted next on cam bolts 25a, 25b, 25c, 25d. Bar 52 is mounted on shafts 25a, 25b and bar 53 is mounted on shafts 25c, 25d. Once cam bars 52, 53 are in place on cam bolts 25a, 25b, 25c, 25d, then nuts 54a, 54b are placed on bolts 25a, 25b and nuts 54c, 54d are placed on bolts 25c, 25d and tightened. Shank cam bolts 25c, 25b, 25c, 25d and cam bars 52, 53 can now slide back and forth as an assembly. During such movement of the assembly, the middle portions of the cam bolts themselves will reciprocate within the respective bottom blade openings 30a, 30b, 30c, 30d and intermediate plate slots 50a, 50b, 50c, 50d and the bottom end portions of the cam bolts will slide in bottom plate recess 26. At the same time, the camming portions of the cam bolts will operate on the respective top blade cam paths 43, 44, 45 and 46 to actuate the top blades.

Referring particularly to FIG. 20, it will be noted that cam bars 52, 53 are somewhat L-shaped in their design in the embodiment illustrated. Cam bar 52 has an angled leg portion 55 which has cut therein an elongated slot 56. Cam bar 53 is similar to cam bar 52 and its angled leg portion 57 has a similar slot 58.

A pair of cam gears 65, 66 (see FIGS. 2 and 24) are used to drive the respective mating cam bars 52, 53. Cam gear 65 has an integral, off-center, pin member 67 which extends downward from the underside of gear 65 which is adjacent to cam bar 52. Pin 67 resides within slot 56; and, since pin 67 is off-center of gear 65, is causes cam bar 52 to reciprocate as gear 65 rotates. Likewise, cam gear 66 has an integral pin member 68 which extends downward from the underside of gear 66 which is adjacent to cam bar 53. Pin 68 resides with slot 58 and, since pin 68 is off-center of gear 66, causes cam bar 53 to reciprocate as gear 66 is rotated.

The reciprocatory motion of cam bar 52 is transferred to top blades 37 and 38 through shank cam bolts 25a and 25b. In a like manner, the reciprocatory motion of cam bar 53 is transferred to top blades 39 and 40 by shank cam bolts 25c and 25d. Thus, blades 37, 38 operate together and in phase and blades 39, 40 operate together as a separate pair and in phase. As later explained, the two pairs are operated out of phase with each other in order to provide a dynamic counterbalance, reduce vibration and achieve load leveling.

Figure 24:
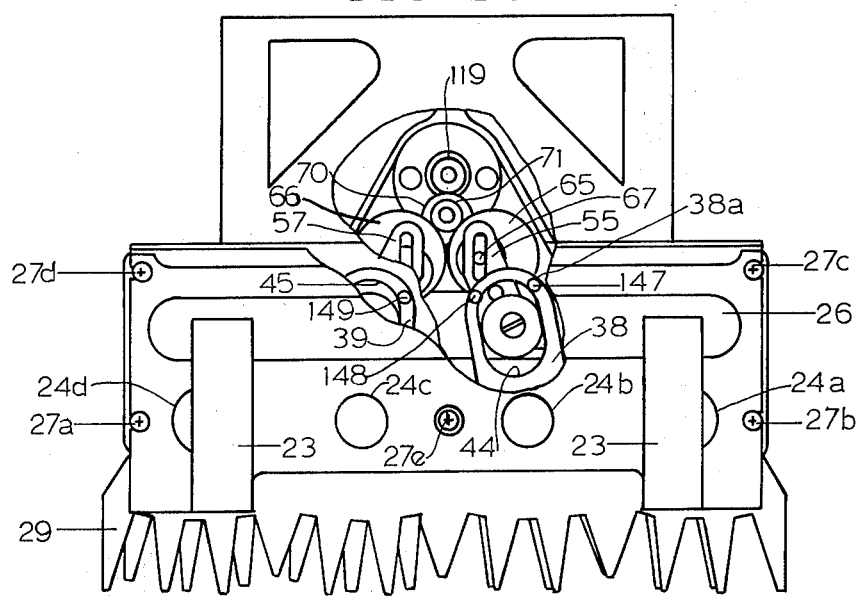
FIG. 24 is a fragmentary bottom view of the assembled cutting mechanism with portions thereof cut away to show the camming mechanism.

To continue the description of the top blades' drive, a combination gear 69 (FIG. 2) is provided which has two sets of gears 70, 71 (FIG. 24). Gear 70 is of a larger diameter than that of gear 71. Gear 71 is located between and meshes with cam gears 65, 66 and when the combination gear 69 rotates, it causes gears 65, 66 to be driven by gear 71. Combination gear 69 in turn mounts for rotation on a shaft 114 (FIG. 5) which extends downward from the inside of a motor/gear base 84. Shafts 180, 181 are integrally secured to cam gears 65, 66 for rotation. Shafts 180, 181 are received by sleeve bearings 185, 186 which in turn fit into holes 187, 188 in motor/gear base 84.

FIGS. 2, 4, 5, 13 and 14 further illustrate the motor/gear base 84 which mounts on top of intermediate plate 49 and above cam bars 52, 53 and acts as a shield or cover for the gears and mechanism beneath. As shown in FIGS. 13 and 14, base 84 is molded and is of hollow construction for this purpose. Screws 85, 86, 87, 88 pass through slots 89, 90, 91, 92 in intermediate plate 49 and with the additional screws 93, 94, are secured into the respective internally threaded holes 97, 98, 99, 100, 101 and 102 (not shown) in motor/gear 84 and which effectively secures intermediate plate 49 to motor/gear base 84. This blade subassembly is completed once top blades 37, 38, 39, 40 are locked in place by retaining rings 42a, 42b, 42c, 42d and skid plate 22 and bottom blade 29 along with the top blades 37, 38, 39, 40 are secured to motor/gear base 84 by screws 27a, 27b, 27c, 27d and 27e as best seen in FIG. 2.

FIGS. 2, 4, 5 and 15–19 illustrate the motor subassembly 105 which consists of motor 106, leads 107, 108, pinion clutch 109, clutch spring plate 110, torsion spring 111 and retaining ring 112. Motor 106 is suitably secured to motor mount portion 113 of motor/gear base 84 and motor shaft 114 extends through hole 115 in motor mount 113 and has mounted thereon the mentioned clutch spring plate 110. FIGS. 16 and 17 show plate 110 as having a circular recessed area 116 which receives one formed end of torsion spring 111. Clutch spring plate 110 has a central hole 110a through which motor drive shaft 114 extends. In making up this motor subassembly, once clutch plate 110 is in place, torsion spring 111 is placed on shaft 114 and one coil end thereof is positioned to rest in recessed area 116 of plate 110. The pinion clutch member 109, illustrated in FIGS. 18 and 19, is slipped onto shaft 114 which passes through hole 117 in clutch 109. The face of clutch 109 has a recessed area 118 like that of recessed area 116 of plate 110. Recessed area 118 receives the opposite coil end of torsion spring 111. Thus, spring 111 is effectively captured and provides a drive connection between clutch 109 and plate 110. As an alternative to the spring-clutch mechanism, a conventional friction clutch could be employed to absorb abrupt blade stoppage.

The bottom portion of pinion clutch 109 has primary gear teeth 119 which mesh with gear teeth 70 of combination gear 69 as seen in FIG. 5. Thus, as motor 106 is energized, pinion clutch 109 is rotated by shaft 114 through the previously described spring-clutch mechanism which then drives gear 71 which in turn drives gears 65, 66 which reciprocate bars 52, 53 and cause the top blade pair, blades 37–38, and the top blade pair, 39–40, to oscillate for the cutting action.

For purposes of ground support during use of the trimmer intermediate plate 49 has a pair of vertical axle support members 72, 73 with holes 74, 75 for mounting in axle 76. Axle 76 receives a pair of end mounted wheels 77, 78 which are held on axle 76 by conventional wheel retainers 79, 80 as previously mentioned. The entire blade structure and drive mechanism is enclosed beneath shroud 14 and in front of shroud deck 15. Once the blade structure and drive mechanism is assembled, this is made integral with shroud 14 by a pair of screws 59, 60 which pass through holes 61, 62 in motor/gear base 84 and screw into internally threaded bosses 63, 64 on the interior of shroud 14 (see FIGS. 2 and 6). In addition, axle 76 slides into axle supports 120a 120b made as extensions to shroud deck 15 (see FIGS. 2, 7 and 8). Handle 11 mounts on axle 76 and is secured by bolts and nuts 167, 168 (FIG. 5) in openings 165, 166.

Figure 32:
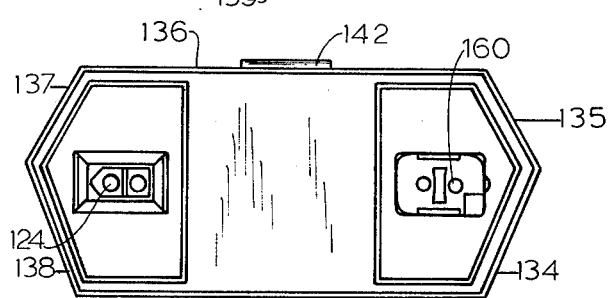
FIG. 32 is a rear elevation view of the battery pack housing of FIG. 30.
Figure 34:
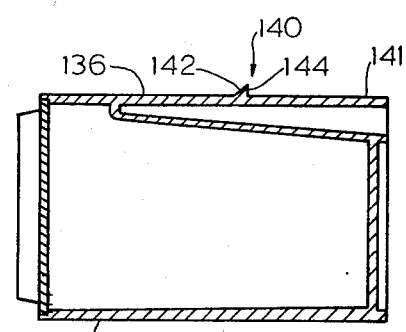
FIG. 34 is a section view of the battery pack housing taken substantially along line 34—34 of FIG. 30.
Figure 35:
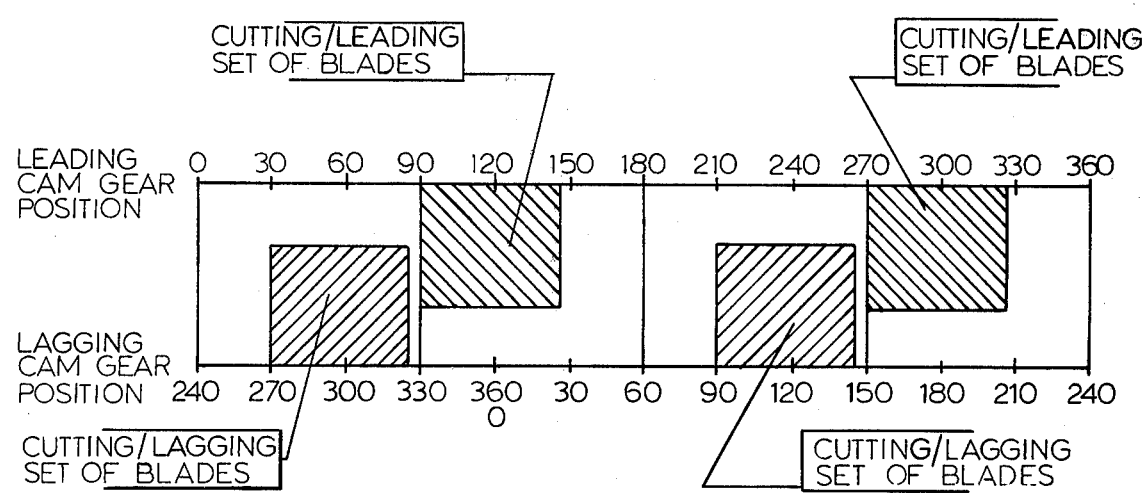
FIG. 35 is a cam/gear timing schematic drawing.

Referring next to the battery arrangement, after shroud 14 and shroud deck 15 are assembled into an integral unit and the blade and drive mechanism are attached as has been described previously. An enclosed cavity 121 is provided in which a battery pack 122 is mounted. Cavity 121 is formed as an elevated and rearwardly opening storage cavity 121 for the battery pack 122. An electrical connector 123 is secured to the inside or back wall 125 of cavity 121 and is electrically connectd to leads 107, 108 of motor 106. Connector 123 is a female type connector and receives an appropriate male connector 124 on battery pack 122 as shown in FIGS. 2 and 32. The bottom wall 126 of cavity 121 has a pair of ridges 127, 128 which help align and also support battery pack 122.

Cavity 121 is hexagonal shaped in cross section with its top wall 129 and bottom wall 126 being substantially longer than the other four sides 130, 131, 132, 133.

Battery pack 122 can be seen to be of the same hexagonal shape in cross section as cavity 121 and is formed by sidewalls 134, 135, top wall 136, sidewalls 137, 138, and bottom wall 139. Cavity 121 is formed with a depth less than the length of battery pack 122 which facilitates removal since pack 122 cannot enter fully into cavity 121. For purpose of securement, battery pack 122 has a latch arrangement 140 molded as an integral part of its top wall 136 and which takes the form of a flexible, molded, cantilevered strip 141 having an appended upwardly extending ridge or projection 142. In use, as battery pack 122 is slid into cavity 121, ridge 142 rides against a downwardly extending lip 143 formed on the inside of the cavity top wall 129 and until ridge 142 is totally within cavity 121 at which time it springs upward and the back 144 of ridge 142 resides against the inward edge of lip 143 which mechanically locks pack 122 in cavity 121. By depressing the outer end of strip 141, ridge 142 may be lowered below the inner edge of lip 143 which allows battery pack 122 to be withdrawn from cavity 121. As battery pack 122 is slid into cavity 121, male connector 124 aligns with female connector 123 and once pack 122 is latched in position creates an electrical connection so that battery pack 122 may be electrically connected to drive motor 106. The shape of cavity 121 assures proper orientation of pack 122.

As previously explained, the "top blade" of the trimmer of the invention actually comprises four blades rather than a single blade as in sickle bar mowers and the like. The four blades are preferably stamped out of relatively thin sheet metal and each top blade may basically duplicate the single blade construction and the bottom blade may be stamped of thin metal as illustrated in prior art U.S. Pat. No. 3,623,223. Also, as previously explained, blades 37, 38 are driven together as one top blade set and blades 39, 40 are driven together as another top blade set. Unlike the conventional sickle bar type mower in which all the top blade teeth cut during essentially the same time periods, the top blade sets of the invention are driven so that the one top blade pair, i.e., blades 37, 38, cut during a different time period than the time period during which the other top blade pair, i.e., blades 39, 40, cut. This operation is illustrated in FIGS. 23, 25-28 and 35 and can be compared with the single top blade sickle bat type operation as in U.S. Pat. No. 2,351,460 or can be compared with the plural top blade construction such as in U.S. Pat. No. 3,049,082 in which both top blades cut during the same time period.

The advantages of operating the top blades asynchronously rather than synchronously are many. The vibration is substantially reduced, the load placed both mechanically and electrically on the drive source is made more even or "leveled," and the peak power requirement is reduced and battery life is extended. This operation is achieved in the present embodiment by locating the pins 67, 68 of cam gears 65, 66 so that they drive approximately 120° out of phase. That is, in the course of any rotation of cam gear 65, its pin 67 is at all times approximately 120° out of phase with respect to the location of pin 68 on cam gear 65. This asynchronous operation of cam gears 65, 66 reflects itself through the bar 52, 53 linkage in asynchronous operation of the top blade pair 37, 38 with respect to the other top blade pair 39, 40. That is, blades 37, 38 work synchronously with respect to each other but asynchronously as a pair with respect to the other top blade pair 39, 40. The same can be said for blades 39, 40.

Figure 25:
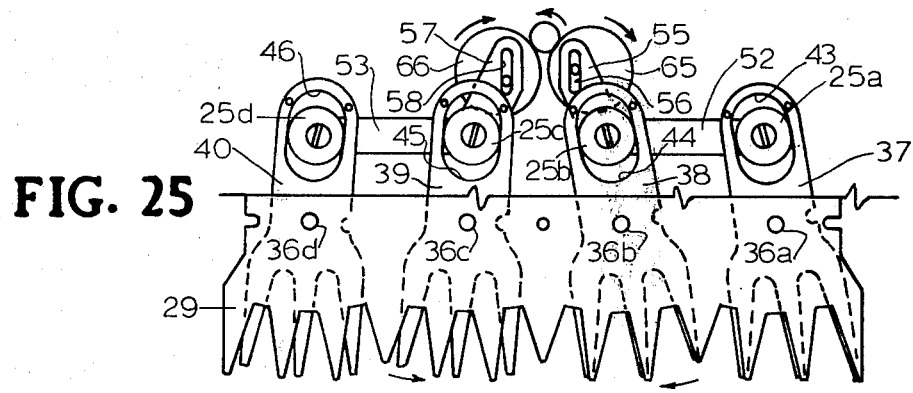
FIG. 25 is a reduced fragmentary bottom view showing the relation of the bottom and top blades with the cams in a predetermined position.
Figure 26:
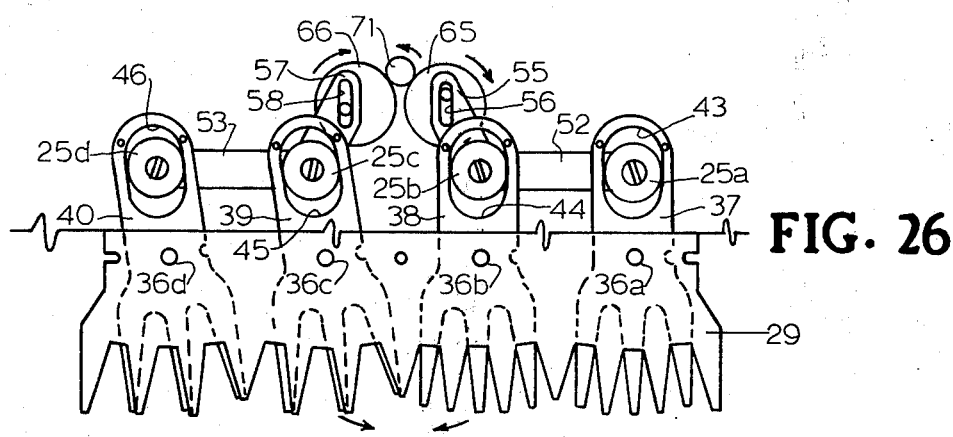
FIG. 26 is a view like that of FIG. 25 with the blades and cams in another position.
Figure 27:
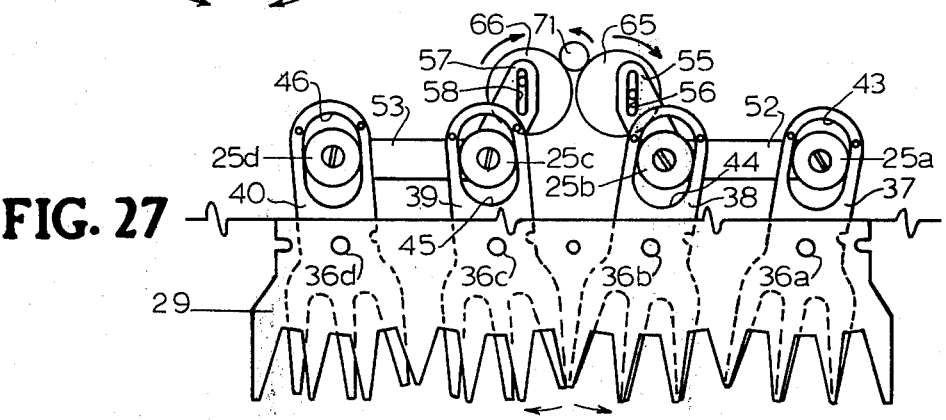
FIG. 27 is a view like that of FIGS. 25 and 26 with the blades and cams in another position.
Figure 28:
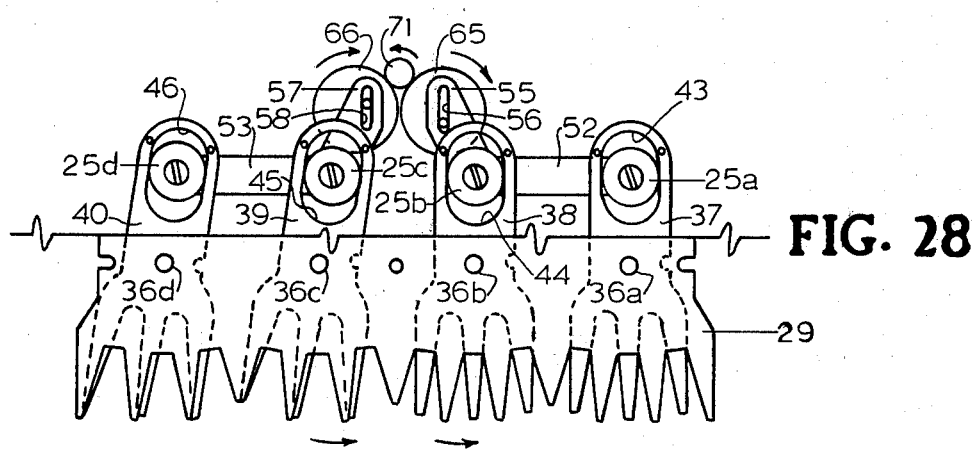
FIG. 28 is a view like that of FIGS. 25, 26, and 27 with the blades and cams in still another position.
Figure 30:
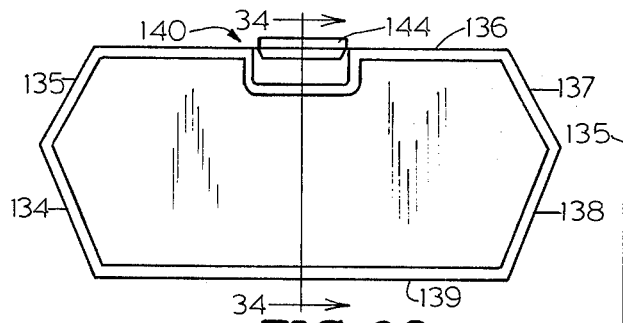
FIG. 30 is a front elevation view of the battery pack housing.
Figure 33:
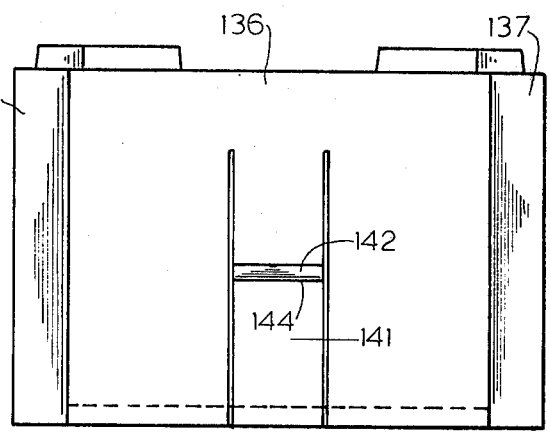
FIG. 33 is a top plan view of the battery pack housing of FIG. 30.
Figure 31:
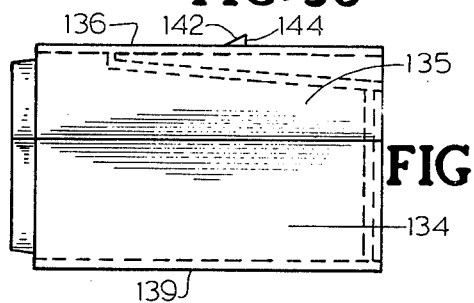
FIG. 31 is a side elevation view of the battery pack housing of FIG. 30, the side not shown being a mirror image thereof.

FIGS. 25-28 show various positions assumed by the two sets of top blades at various times in the cutting cycle. In FIG. 25, position and lagging cam gear 66 is in approximately the 240° position, it can be seen that the set comprising blades 39, 40 are preparing to cut whereas the other set comprising blades 37, 38 is finishing its cut. In FIG. 26, as cam gears 65, 66 continue their rotation to a point where leading cam gear 65 is in the 90° position and lagging cam gear 66 is in the 330° position, the blade set comprising blades 39, 40 is finishing its cut whereas the blade set comprising blades 37, 38 is shown starting its cut. FIGS. 27 and 28 illustrate still further positions in which the two sets of blades can be seen to be operating asynchronously.

It will be apparent that the asynchronous phasing achieves a degree of counterbalancing. Complete counterbalancing could be achieved by operating the two sets of top blades 180° out of phase with each other. However, such perfect counterbalancing would cause the blades to cut at the same time and this would defeat another objective, namely, to make the load requirements as uniform as possible. The 120° out of phase relation is thus a compromise which admittedly does not achieve perfect counterbalancing or perfect freedom from vibration. However, it does represent a vast improvement over the prior art method of cutting with a single top blade and with all teeth cutting at the same time as in prior art U.S. Pat. No. 2,351,460 and over the prior art method illustrated in U.S. Pat. No. 3,049,802 or 3,218,710 where a pair of top blades are operated effectively 180° out of phase.

Expressed in terms of one cycle of 360° rotation of the cam gears, the particular embodiment illustrated effectively causes one top blade set to cut for 60° of rotation, then the other top blade set cuts for 60° of rotation, then during the next 60° of rotation there is no cutting as blade reversing takes place. These three operations thus utilize 180° of rotation after which the blades repeat the same sequence for another 180° of rotation to complete the cycle. While various degrees of phase difference will achieve improvements, applicants have found that if the central axis of one set of top blades leads the central axis of the other set of top blades by one-third of a cycle, a practical optimum is achieved; one-sixth to five-twelfths being a range.

It will be understood that control 12 comprises a switch arranged to electrically connect motor 106 and battery pack 122. In use, control switch 12 is switched "on" which connects motor 106 to battery pack 122 and trimming can commence. Obstructions will cause the described spring clutch arrangement to absorb any temporary shock. For recharging, a conventional connector 160 on battery pack 122 is utilized for connecting the battery pack to a suitable recharging apparatus, not shown.

The top blade teeth are preferably curved downwardly as illustrated in U.S. Pat. No. 3,623,223. One advantage of the described construction is that the top blades can be easily replaced, individually or collectively, simply by removing the skid plate 22, bottom blade 29, and the various top blade retainer rings, 42a, 42b, 42c and 42d. The stamped metal construction employed to make the blades provides effective cutting and economy in such repairs. Since individual top blades can be replaced, damage to one top blade tooth requires only that the top blade having that tooth be replaced.

Figure 23:
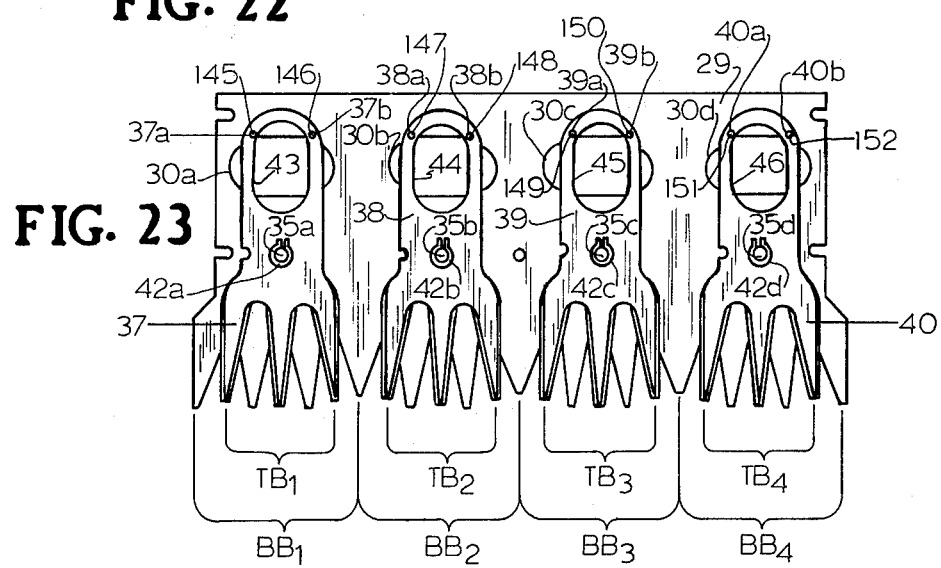
FIG. 23 is a top plan view of the top and bottom blades once assembled.

FIG. 23 illustrates how the bottom blade effectively has four sets of teeth identified as $BB_1$, $BB_2$, $BB_3$ and $BB_4$. The top blades also effectively provide four sets of mating teeth identified as $TB_1$, $TB_2$, $TB_3$ and $TB_4$. U.S. Pat. No. 3,623,223 has previously taught the many advantages of utilizing stamped metal blades and a pivotal top blade for battery operation in cutting a narrow swath. The present invention thus preserves all of these advantages in providing low cost manufacture, relatively low power consumption, and relatively long battery life but for a relatively wide swath, e.g., a 12 inches swath versus a narrow 3 inches swath.

In summary, the trimmer of the invention provides a relatively low cost and long wearing cordless and rechargeable battery operated trimmer. Vibration is reduced, and the leveling of the mechanical and electrical load has been achieved. The need for a top pressure plate has been eliminated by use of the mentioned buttons 145-152 and the close pivotal relation of the top blades with respect to the bottom blade. Protection from shock is achieved through the described clutch mechanism. Both protection and easy access to the drive mechanism are achieved by the slide-on shroud arrangement described. Since a battery pack in the nature of pack 122 can be sold at a reasonably low price, it can also be seen that the user can gain many hours of trimming time simply by using a pair of battery packs intermittently such that one pack is used while the other is charged. The dangers of the usual rotary blade type equipment are also eliminated by employing blades which oscillate on the same plane and are connected to a clutch mechanism.

While the described trimmer construction is primarily useful in rechargeable battery-operated grass trimmers, the described blade construction can be used in A.C. operated as well as D.C. operated grass trimmers. In this regard, it will also be appreciated that an A.C. power supply does not have the severe power limitations as does a rechargeable battery. Therefore, load leveling becomes less critical. The described battery pack construction also has application to other battery-operated tools. Those skilled in the art will also readily appreciate that the blade configuration could be employed and its many advantages obtained with the movable blades disposed below rather than above the fixed blade as illustrated. Thus, the invention makes a broad range of contributions to the prior art concerned with tool construction and cutting tools.

What is claimed is:

1. An electrically operated grass trimmer comprising, in combination:
   a. a base structure having appended handle and wheel means for manual movement over a lawn;
   b. a fixed horizontal bottom cutting blade formed of flat sheet metal and having a plurality of shaped teeth formed in groups on and extending from one long edge of a rectangular body portion thereof and being fixedly secured on the base structure with the teeth positioned forwardly thereof;
   c. four horizontal coplanar upper cutting blades formed of flat sheet metal and being separately pivotally mounted on said bottom blade body portion for pivotal movement thereon about separate spaced apart axes of rotation, said upper blades having respective flat rearward body portions overlapping on the lower surfaces thereof the upper side of the bottom blade for oscillatory motion thereon and respective integral forward end portions with respective groups of plural teeth formed therein, overlapping and slidably engaging respective mating groups of the bottom blade for oscillatory motion thereon, each said top blade including in its respective rearward portion an opening rearward of its respective pivotal mount, said opening being adapted to engage reciprocating means to effect the oscillation of such blade, said four blades being arranged in adjacent pairs and with each pair being adapted to being driven by a common oscillating drive;
   d. a motor mounted on said base structure and having a drive shaft extending therefrom;
   e. a manual control switch and connecting wiring for electrically connecting the motor to an electrical source to drive the shaft;
   f. a pair of coplanar gears arranged for being driven by said drive shaft; and
   g. a pair of linearly movable bar members each having an off-center drive connection to a respective said gear, said connections being operative out-of-phase and adapting said bar members for being asynchronously and separately driven in continuous reciprocating motions thereby, each bar member having means thereon for engaging the openings in one pair of said top blades for oscillating the blade teeth thereon so that the central axes of one pair of blades leads the central axes of the other pair by a predetermined portion of the blade cycle.

2. A trimmer as claimed in claim 1 wherein each said gear has an off-center pin member thereon and said out-of-phase connections are established through said pin members.

3. A trimmer as claimed in claim 1 wherein the central axes of one pair of said top blades lead the central axes of the other pair of said top blades by between one-sixth to five twelfths of one blade cycle.

4. A trimmer as claimed in claim 1 wherein the central axes of one pair of said top blades lead the central axes of the other pair of said top blades by approximately one-third of one blade cycle.

5. A battery-operated grass trimmer comprising, in combination:
   a. a base structure having appended handle and wheel means for manual movement over a lawn;
   b. a fixed horizontal cutting blade formed of flat sheet metal and having a plurality of shaped teeth formed in groups on and extending from one long edge of a rectangular body portion thereof and being fixedly secured on the base structure with the teeth positioned forwardly thereof;
   c. a plurality of horizontal coplanar movable cutting blades formed of flat sheet metal and being separately pivotally mounted on said fixed blade body portion for pivotal movement thereon about separate spaced apart axes of rotation, said movable blades having respective flat rearward body portions overlapping one side of the fixed blade for oscillatory motion thereon and respective integral forward end portions with respective groups of plural teeth formed therein, overlapping and slidably engaging respective mating groups of the fixed blade teeth, each said movable blade including in its respective rearward portion an opening rearward of its respective pivotal mount, said opening being adapted to engage reciprocating means to effect the oscillation of such blade;

d. a rechargeable battery mounted for support on said base structure;

e. a motor mounted on said base structure and having a drive shaft extending therefrom;

f. a manual control switch having connecting wiring for electrically connecting the battery to the motor to drive the shaft;

g. a plurality of linearly movable bar members adapted for continuous asynchronous linear reciprocating motion, each said bar member having means for engaging the opening of at least one movable blade rearward portion for oscillating the teeth of such at least one movable blade; and h. connector means operated by said drive shaft and adapted for converting the continuous rotative motion of said drive shaft into a plurality of continuous asynchronous linear reciprocating motions, the number of said motions being equal to the number of said bar members and each of said motions being imparted to one of said bar members; whereby the asynchronous reciprocating motions of said bar members serve to oscillate the respective movable blades so that the central axes of the movable blades so driven by one said bar member lead or lag each movable blade separately driven by another said bar member by some portion of one blade cycle, thereby effecting a counterbalancing and load leveling effect.

6. A trimmer as claimed in claim 4 and wherein said wheel means comprises an axle mounted on said base structure and a pair of wheels mounted on the ends thereof and including housing means removably secured to said base structure, said housing providing a covering for said base structure, motor connector means and bar members and further providing an outwardly opening storage cavity for receiving the battery, said cavity and battery having cooperating electrical connector means for electrically connecting the pack to power the motor.

7. A trimmer as claimed in claim 6 and wherein said battery includes a molded battery housing having a top wall portion therein, and said top wall portion includes a rearwardly extending, molded cantilevered strip member having a normal elevated position with freedom to be flexed downwardly to assume a lower angled position, a selected top portion of said strip member and a selected mating interior surface portion of said cavity being formed with inter-engaging locking surfaces such that said battery when appropriately installed in said cavity may be releasably locked by allowing said strip member to assume its elevated position and said surfaces to inter-engage and such that said battery may be removed from said cavity by allowing said strip member to assume its lower angled position and said surfaces to disengage.

8. A trimmer as claimed in claim 5 having exactly four movable blades and having exactly two bar members, each said bar member serving to engage and oscillate a set of two adjacent movable blades.

9. A trimmer as claimed in claim 8 wherein the central axes of one said set of movable blades lead the central axes of the other said set of movable blades by between one-six to five-twelfths of one blade cycle.

10. A trimmer as claimed in claim 8 wherein the central axes of one said set of movable blades lead the central axes of the other said set of movable blades by approximately one-third of one blade cycle.

11. A trimmer as claimed in claim 8 wherein said connector means includes a pair of cam gears, each having a member thereon for engaging and reciprocating its respective bar member, said cam gears comprising a first leading cam gear and a second lagging cam gear for driving said members out-of-phase and thereby moving said bar members asynchronously.

* * * * *

UNITED STATES PATENT OFFICE
CERTIFICATE OF CORRECTION

Patent No. 3,973,378  Dated August 10, 1976

Inventor(s) William E. Bartasevich, et al.

It is certified that error appears in the above-identified patent and that said Letters Patent are hereby corrected as shown below:

In Abstract, line 1, "incorporated" should be deleted.
In Abstract, line 2, insert --a-- before "fixed".
Col. 4, line 19, "closing" should be --close--.
Col. 4, line 65, 2nd appearance of "25c" should be --25a--.
Col. 5, line 19, 2nd appearance of "is" should be --it--.
Col. 6, line 34, insert --,-- after "trimmer".
Col. 7, line 47, "bat" should be --bar--.
Col. 8, line 5, insert after "25," --for example, where leading cam gear 65 is in approximately the 0°--
Col. 9, line 14, both occurences of "inches" should be --inch--.

Signed and Sealed this

Thirtieth Day of November 1976

[SEAL]

Attest:

RUTH C. MASON
Attesting Officer

C. MARSHALL DANN
Commissioner of Patents and Trademarks